(No Model.)
2 Sheets—Sheet 1.

F. J. BECKER.
CORN PLANTER.

No. 539,763. Patented May 21, 1895.

Witnesses.
J. J. Richardson
J. E. Hancock

Frank J. Becker INVENTOR
By Robert S. Carr Atty.

(No Model.)
2 Sheets—Sheet 2.

F. J. BECKER.
CORN PLANTER.

No. 539,763.   Patented May 21, 1895.

Witnesses.
J. J. Richardson
J. E. Hancock

Frank J. Becker, INVENTOR
By Robert S. Carr Att'y.

UNITED STATES PATENT OFFICE.

FRANK J. BECKER, OF HAMILTON, OHIO, ASSIGNOR TO THE H. P. DEUSCHER COMPANY, OF SAME PLACE.

CORN-PLANTER.

SPECIFICATION forming part of Letters Patent No. 539,768, dated May 21, 1895.

Application filed December 26, 1894. Serial No. 532,938. (No model.)

*To all whom it may concern:*

Be it known that I, FRANK J. BECKER, of Hamilton, Ohio, have invented certain new and useful Improvements in Corn-Planters, of which the following is a specification.

My invention relates to that class of corn planters known as checkrow planters, and the objects of my improvement are to provide such construction and combination of the various parts of the check row mechanism as will facilitate its automatic action and secure the greatest efficiency of its operation, and to this end reference is had to the following description as illustrated in the accompanying drawings, in which—

Figure 1:
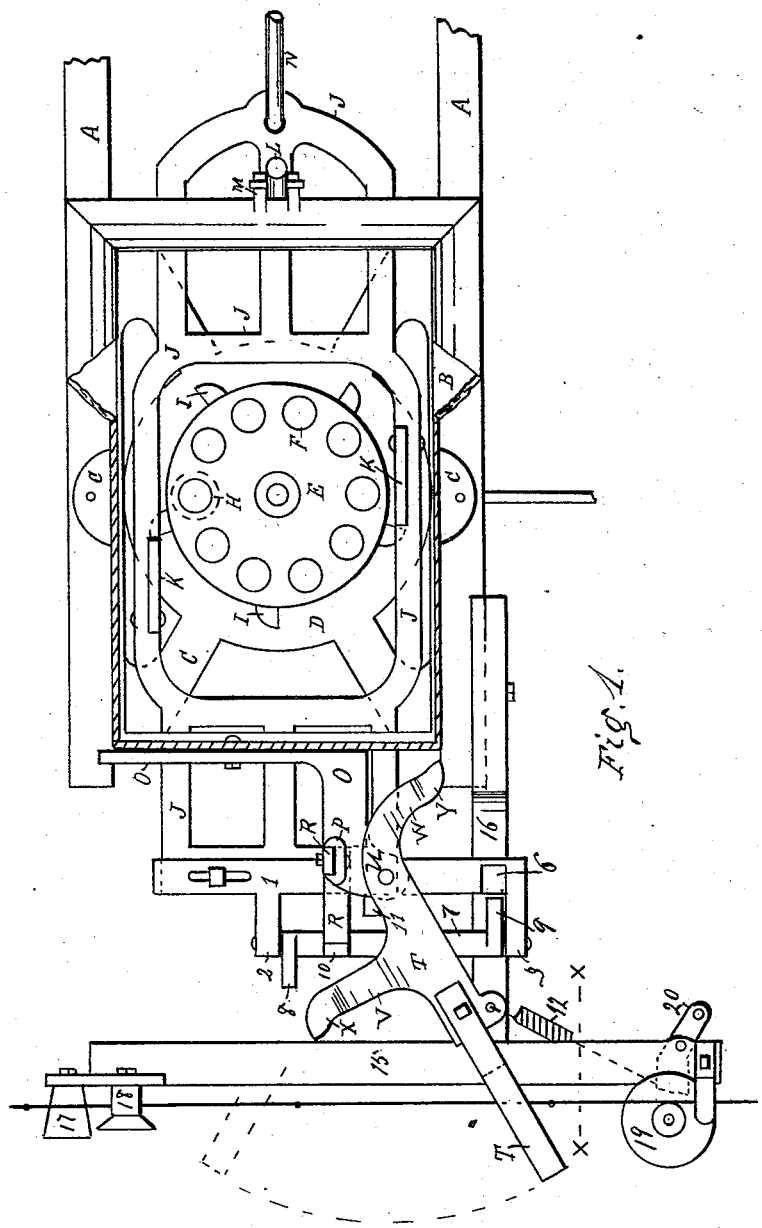
Figure 3:
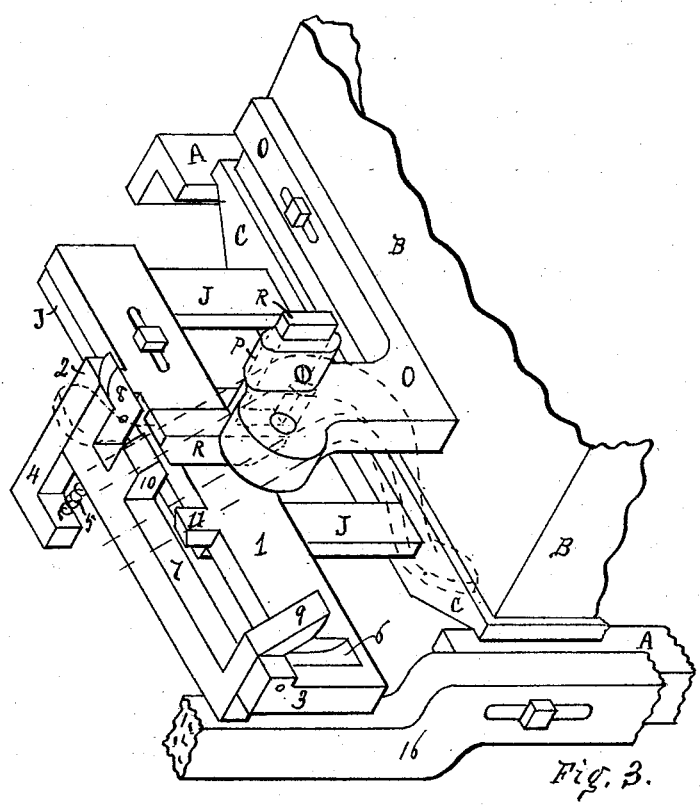
Figure 2:
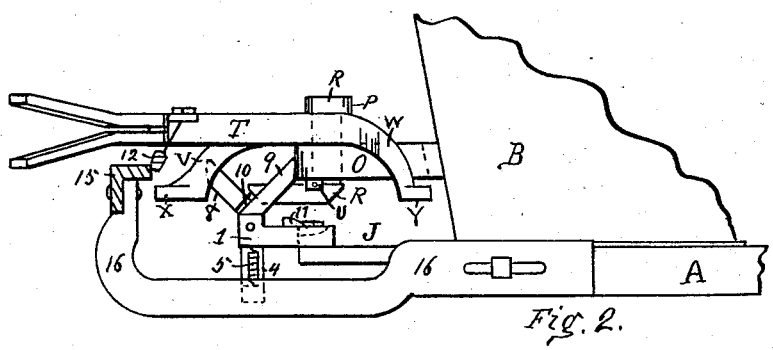

Figure 1 is a plan of my improvement applied to the seed-box of a planter; Fig. 2, a front elevation thereof; Fig. 3, an isometrical view of the principal details properly assembled.

In the drawings, A represents portions of the runner frame of a corn planter; B, one of the two seed boxes carried on opposite ends of the runner frame; C, the bottom frame of the seed box and formed with a flat center portion D to serve as a seat or bottom plate under the dropping disk E. Said disk is pivotally mounted on said bottom plate to rotate horizontally and it is formed with a series of marginal chambers or openings F to separate and carry the corn under the usual sweeping device (not shown) and deposit it into the seed spout thereunder through opening H— shown in dotted lines—in said bottom plate D. Catches or teeth I project from the edge of the disk and are formed preferably integral therewith. Slide J is movable in the same plane of the disk and rides on the bottom frame C. Its extremities terminate without and beyond the ends of the seed box. Gravity pawls K are pivotally attached to opposite sides of the slide to alternately engage with the catches on the disk and impart intermittent rotary motion to said disk as the slide is reciprocated. Hand lever L is fulcrumed on bracket M that projects from the inner end of the seed box and it engages with the end of the slide to impart motion thereto as the lever is oscillated by the operator.

Rod N connects the inner end of slide J with the inner end of the slide in the seed box (not shown) on the opposite end of the runner frame, that both slides may be reciprocated simultaneously from the same source. The bottom of the seed box is intended to be closed by a plate (not shown) that leaves only the top surface of the disk exposed to the interior of the seed box.

To the extent of the foregoing description the planter resembles others of the usual construction and form. Horizontal bracket O is adjustably secured on the outer end of the seed box and is formed with vertical seat P on its rear edge wherein guide R is adjustably secured. Said guide depends below the plane of the bracket and terminates in a horizontal plane surface that is beveled in an upward direction at each end. Forked vibrating lever T is horizontally mounted on the outer end of bracket O by means of vertical pivot U. Legs V and W are formed integral with the lever T and are curved outwardly and downwardly from opposite sides thereof until they terminate in horizontal feet X and Y respectively and in substantially the same plane with the lower surface of guide R.

On the outer extremity of slide J housing 1 is adjustably mounted. Said housing is formed with bearings 2 and 3 that are extended horizontally from one of its edges and parallel with each other. Step 4 depends below bearing 2 for the convenient attachment of one end of spring 5 thereto. Seat 6 is formed by a depression in the top surface of the housing contiguous to the base of bearing 3. Bar 7 is pivotally attached by its extremities to the respective bearings 2 and 3 and occupies the length of the gap or space formed between them. Fingers 8 and 9 are formed integral with the respective ends of said bar 7 and extend from the top thereof in a perpendicular direction and parallel with each other for a short distance to the pivots that secure the bar to the bearings 2 and 3. Said fingers are thence turned laterally in opposite directions from the vertical plane of the bar and terminate in planes at right angles to each other. Stop 10 projects above the top surface of bar 7 and its sides are beveled to an edge. During the movement of slide J said stop 10 is carried under guide R. Spring 5 engages with the lower side of bar 7 and exerts a yielding resistance to the axial oscillation of said bar in either direction from its normal position as described. The extent of the oscillation of said bar is limited in one direction by finger 9 becoming seated in seat 6 formed in housing 1 and in the opposite direction by the engagement of lug 11 formed on housing 1 with the edge of said bar. By the oscillation of said bar in this manner fingers 8 and 9 are alternately raised to a vertical position in the path described by the respective feet X and Y carried by the forked lever T. When the forked lever T is turned in a rearward direction by means of the knots on the check wire in the ordinary manner foot X is carried thereby toward the seed box and engages with finger 8 to first oscillate bar 7 until said finger reaches a vertical position and its further movement is prevented by finger 9 becoming seated in recess or seat 6. The continued movement of foot X against said finger 8 drives slide J to the opposite end of its stroke. During the action of foot X on finger 8 the finger 9 on the opposite end of bar 7 is retained in a horizontal position and in seat 6 to permit the outward movement of foot Y directly over it without becoming engaged therewith. Having completed the movement of slide J in one direction in this manner lever T is returned to its normal position by means of spring 12. By again moving lever T in a rearward direction foot Y engages with finger 9, moves it to a vertical position where it is retained from further movement by the contact of stop or lug 11 with bar 7 and causes slide J to be driven by said foot Y to the completion of its stroke in an outward direction from the seed box. In this manner the successive rearward oscillations of lever T by means of the check wire alternately reciprocates slide J in opposite directions and imparts intermittent motion to the dropping mechanism in the seed box. By the action of feet X and Y on the respective fingers 8 and 9, bar 7 is axially oscillated in the direction of movement of slide J and stop 10 on said bar is turned forward under guide R to lock said bar axially immovable until the stroke of said slide J is completed and said stop 10 is released by being carried beyond the opposite end of the guide R. The action of said stop 10 on the surface of guide R prevents bar 7 from resuming its normal position or being reversed in its direction of oscillation until each stroke of slide J is fully completed, however often lever T may be turned rearwardly short of its full sweep.

Check head frame 15 is adjustably secured on bracket arm 16, and said bracket arm is adjustably attached to the runner frame of the planter. The usual guiding sheaves 17 and 18 are pivotally secured to, and project horizontally from the rearward end of the frame 15. Guiding roller 19 is attached to the front end of said frame 15 in such usual manner as permits it to be turned outwardly with its axis from a vertical to a horizontal position to discharge the check wire therefrom. Lever 20 serves to lock said roller 19 in the position with its axis vertical. Spring 12 is engaged by its respective ends with said lever 20 and lever T to retain it in the locked position with roller 19 and to also return lever T forward to its normal position after it is released from the check wire by which it is moved in a rearward direction at intervals that alternate with the action of said spring.

Having fully described my improvements, what I claim as my invention, and desire to secure by Letters Patent, is—

1. The combination with fingers simultaneously movable and carried by a slide of a forked lever mounted to oscillate in a horizontal plane and formed with feet to alternately engage with the respective fingers whereby the slide may be reciprocated in opposite directions respectively by the successive oscillations of the forked lever.

2. The combination with a swinging bar carried on the end of a movable slide and formed at opposite ends with respective fingers at right angles to each other and perpendicular to its axis of oscillation of means to lock said bar in either position of extreme oscillation during the movement of the slide in the corresponding direction and means to exert a yielding resistance to the oscillation of the bar whereby it is caused to resume its normal position upon the completion of each stroke of the slide.

3. The combination with a stationary bracket, a forked lever pivotally mounted thereon and a guide secured to the bracket of movable fingers attached to a slide and a lug movable with the fingers and arranged to movably engage with the guide whereby the respective fingers are locked alternately in the position to intercept the lever in its rearward movement until the corresponding movement of the slide by the lever is completed.

4. The combination with a forked lever pivotally mounted on a bracket secured to the seed box and capable of being oscillated in a horizontal plane in opposite directions respectively by a spring and by a check wire of lever mechanism mounted on one end of a slide and arranged to engage with said lever whereby the slide is moved in opposite directions alternately by the successive rearward movements of the lever by the check wire.

5. The combination with a forked lever formed to engage with lever mechanism on a slide and to move the slide in opposite directions alternately by the successive movements of the lever in the same direction, said lever being pivotally mounted on a bracket secured to the seed box of a check head frame independently mounted on the runner frame by means of a bracket and provided with the usual sheaves and dumping roller to guide the check wire a lever to lock the dumping roller in operative position and a spring engaging therewith and with the forked lever to exert a yielding resistance to the movement of either of said levers from the normal position.

FRANK J. BECKER.

Witnesses:
C. H. SCHELL,
ROBERT S. CARR.